Figure 1:
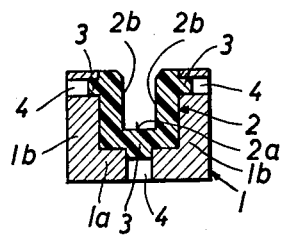

May 1, 1962 — G. BLASE — 3,032,377
RAIL ENGAGING SLIDE GUIDE FOR ELEVATOR CARS
Filed Oct. 6, 1959

INVENTOR
Günter Blase
BY
Lowry & Rinehart
ATTYS.

United States Patent Office 3,032,377
Patented May 1, 1962

3,032,377
RAIL ENGAGING SLIDE GUIDE FOR ELEVATOR CARS
Günter Blase, Koln-Deutz, Germany, assignor to Acla-Werke Aktiengesellschaft, Koln-Mulheim, Germany
Filed Oct. 6, 1959, Ser. No. 844,725
Claims priority, application Germany Oct. 7, 1958
6 Claims. (Cl. 308—3)

This invention relates to a device for the guiding of parts sliding on guide rails, especially guide slides which guide the car of an elevator on fixed guide rails.

The slide guide on elevator cars, especially passenger elevators, are provided on the sides of the car and engage guide rails on the walls of the elevator well or shaft and serve for the stable and safe guidance of the elevator car. The guide rails for the elevators are in most cases constructed of steel and during upward and downward movement of the car, the slide guide slides on the guide rails and by this continuous sliding the slide guides are subjected to considerable wear by which not only the material is affected but which causes more or less noise during such sliding movements. The purpose of the slide guide is to obtain simultaneously as much noiseless running as possible. Different materials have been used as sliding material for the slide guide because the use of metal for both the slide guide and that part of the guide that engages the metallic guide rail produce undue friction, noise and also considerable wear. For these reasons, that part of the slide guide that engages the metallic guide rail has been made from lignum vitae or leather but such inserts are difficult to retain in position.

It has also been proposed to use a plastic material for the rail engaging part of the slide guide, such as polyester and isocyanate which is known under the registered trademark "Vulcollan." The properties of this plastic material make it suitable for use as the guide rail engaging part of a slide guide of this kind, but the use of this material is complicated insofar as it is difficult to adherently connect the plastic material with the metallic body of the slide guide. The connection by adhesives of the plastic material to the metallic slide guide is excessively costly and still does not offer the required guarantee of a tight and lasting fit that assures safety.

This invention has for its object an advantageous solution for the use of the above mentioned plastic material in slide guides for elevators. The invention is characterized in that the rail engaging part of the slide guide consisting of the plastic material is connected as a body of U-shape in cross-section with a similarly shaped metallic supporting body of the slide guide by the use of interconnecting lugs. For this purpose the guide rail engaging part of the slide guide formed from plastic material is provided directly on the outer sides thereof with projecting lugs that engage in suitable openings or bores in the metallic supporting body of the slide guide. It has been found that by this manner of connection the foregoing difficulty resulting in separation of the parts is eliminated.

A further object of this invention resides in the insertion of the guide rail-engaging part with lugs projecting in three directions into the metallic body of the slide guide and which insertion is facilitated by the elastic sliding elasticity of the plastic material. The elastic sliding part is thereby given an immovable and stable fit in the metallic slide guide and the guide rail of the elevator shaft engages the U-shaped recess of the plastic insert so that the same cannot be accidentally removed from the metallic supporting body.

With the above and other objects in view that will become apparent as the nature of the invention is better understood, the same consists in the novel form, combination and arrangement of parts hereinafter more fully described, shown in the accompanying drawing, and claimed.

Figure 2:
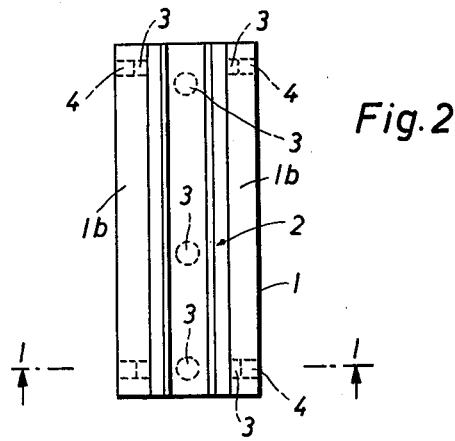

In the drawing:
FIG. 1 is a cross-sectional view taken on line 1—1 of FIG. 2, showing the plastic insert seated in and interfittingly engaged with the metallic slide guide;
FIG. 2 is a front elevational view of the guide slide, and
FIG. 3 is a diagrammatic top plan view of an elevator shaft and car, showing guide rails in the shaft and guide slides on the car engaged with the rails.

Figure 3:
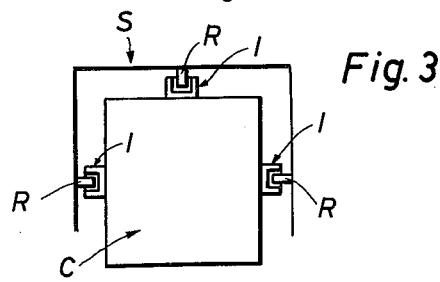

As diagrammatically illustrated by top plan view in FIG. 3, the well or elevator shaft is designated by the letter S with the elevator car designated by the letter C that projects from one side of the elevator shaft S, three sides of the elevator shaft being provided with guide rails R, while three sides of the car C carry slide guides designated in general by the reference character 1.

The invention herein primarily resides in the construction of the slide guide 1 and its association with the guide rails R, and as shown in FIGS. 1 and 2, the slide guide 1 is of U-shape in cross section, comprising a base portion 1a and side walls 1b, the slide guide 1 being of steel construction as is common in devices of this character.

To eliminate friction, wear, noise and to reduce expense of repairs occasioned by contact of the slide guide 1 with the guide rails R, there is provided, as shown in FIGS. 1 and 2, an insert for the slide guide that is formed of plastic material, preferably the known addition product of polyester and isocyanate designated in general by the reference character 2 and this plastic insert is of U-shape in cross-section and proportioned to nest within the U-shaped slide guide body 1. The plastic insert 2 of U-shape has a bottom wall 2a and side walls 2b. To retain the plastic insert 2 within the metallic slide guide body 1, the outer sides of the side walls 2b of the insert carry lugs 3 and a similar lug 3 is carried by the bottom wall 2a of the insert that are respectively received in openings of the bores 4 formed in the bottom wall 1a and side walls 1b of the guide slide. It will of course be understood that this method of interconnecting the guide slide body and the plastic insert may be reversed, lugs projecting inwardly of the walls of the U-shaped guide slide for insertion in corresponding openings or bores in the plastic insert. It will be understood that the interconnections between the metallic guide slide body and the plastic insert may be varied in number and location, it being preferred to have more of such interconnections adjacent the upper and lower ends of the slide guide than would appear intermediate the ends thereof as presently illustrated on the drawings.

The particular connection between the plastic insert and the metallic slide guide body is an inexpensive one and yet performs its function in a perfect manner to retain the plastic insert in its proper relationship with the metallic slide guide body.

The materials constituting the plastic insert are preferably made from harder types thereof which have a shore hardness of about 90 to 95°. Also, to improve the sliding conditions between the slide guides and the guide rails, desired amounts of molybdenum sulphide may be added to the plastic material.

While there is herein shown and described the preferred embodiment of the invention, it is nevertheless to be understood that minor changes may be made therein without departing from the spirit and scope of the invention as claimed.

What is claimed is:

1. A slide guide for guiding reciprocating parts on a guide rail comprising a metallic body member having a U-shaped cross-section, an elastic, friction-reducing U-shaped cross-sectional insert elastically retained in said body member and having an outer surface complementary to the inner surface of said body member, said members including cooperating interengageable portions retaining said insert against longitudinal displacement therein, said interengageable portions comprising at least three laterally projecting lugs integral with one of said members and being disposed at three different sides thereof, the other of said members including apertured portions in three different sides thereof and removably receiving said lugs therein, said U-shaped insert including a base and legs and being removable from said body member by first moving said legs together to disengage oppositely facing ones of said lugs.

2. The structure of claim 1; said lugs being integrally formed on said insert, and said apertured portions partially receiving said lugs therein and extending entirely through said body member.

3. The structure of claim 2; said insert comprising a polyester-isocyanate-addition product.

4. The combination of an elevator guide rail and a slide guide for guiding an elevator car on said guide rail, said slide guide comprising a metallic body member having a U-shaped cross-section, an elastic, friction-reducing U-shaped cross-sectional insert elastically retained in said body member and having an outer surface complementary to the inner surface of said body member, said members including cooperating interengageable portions retaining said insert against longitudinal displacement therein, said interengageable portions comprising at least three laterally projecting lugs integral with one of said members and being disposed at three different sides thereof, the other of said members including apertured portions in three different sides thereof and removably receiving said lugs therein, said U-shaped insert including a base and legs and being removable from said body member by first moving said legs together to disengage oppositely facing ones of said lugs, said guide rail being disposed within said U-shaped insert and preventing movement of said legs to release said lugs to thereby prevent the accidental removal of said U-shaped insert.

5. The structure of claim 4; said lugs being integrally formed on said insert, and said apertured portions partially receiving said lugs therein and extending entirely through said body member.

6. The structure of claim 5; said insert comprising a polyester-isocyanate-addition product.

References Cited in the file of this patent

UNITED STATES PATENTS

| | | |
|---|---|---|
| 1,916,365 | Dunlop | July 4, 1933 |
| 2,424,883 | Habgood | July 29, 1947 |
| 2,427,828 | Wunsch | Sept. 23, 1947 |
| 2,490,652 | Sahlin | Dec. 6, 1949 |
| 2,646,333 | Abrahamson et al. | July 21, 1953 |
| 2,759,773 | Wilmer et al. | Aug. 21, 1956 |
| 2,835,539 | Conrad | May 20, 1958 |

FOREIGN PATENTS

| | | |
|---|---|---|
| 778,816 | Great Britain | July 10, 1957 |